United States Patent
Tanahashi

(10) Patent No.: US 11,695,314 B2
(45) Date of Patent: Jul. 4, 2023

(54) ELECTRIC DRIVE UNIT FOR DRIVING A VEHICLE

(71) Applicant: TOYOTA JIDOSHA KABUSHIKI KAISHA, Toyota (JP)

(72) Inventor: Fumiki Tanahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 17/342,637

(22) Filed: Jun. 9, 2021

(65) Prior Publication Data

US 2022/0021287 A1 Jan. 20, 2022

(30) Foreign Application Priority Data

Jul. 20, 2020 (JP) ................................ 2020-124001

(51) Int. Cl.
*H02K 5/22* (2006.01)
*H02K 11/33* (2016.01)
*H02K 27/12* (2006.01)

(52) U.S. Cl.
CPC ............. *H02K 27/12* (2013.01); *H02K 5/225* (2013.01); *H02K 11/33* (2016.01)

(58) Field of Classification Search
CPC ............ H02K 3/50; H02K 3/52; H02K 3/521; H02K 3/522; H02K 5/22; H02K 5/225; H02K 11/30; H02K 11/33; H02K 47/02; H02K 47/04; H02K 2203/06; H02K 2203/09

See application file for complete search history.

(56) References Cited

U.S. PATENT DOCUMENTS

| 2009/0251018 A1* | 10/2009 | Koshida ............... H02K 7/1815 310/71 |
| 2012/0121971 A1 | 5/2012 | Kim |
| 2015/0244242 A1* | 8/2015 | Okano ................... H02K 9/193 310/54 |

FOREIGN PATENT DOCUMENTS

| JP | 2009-254144 A | 10/2009 |
| JP | 2009284660 A | * 12/2009 |

(Continued)

OTHER PUBLICATIONS

Yasuda, Machine Translation of JP2009284660, Dec. 2009 (Year: 2009).*

(Continued)

*Primary Examiner* — Eric Johnson
(74) *Attorney, Agent, or Firm* — Oliff PLC

(57) ABSTRACT

An electric drive unit includes a multi-phase AC motor including a plurality of first terminals, and a power converter including a plurality of second terminals. The power converter is fixed to an electric motor case so as to partially overlap the AC motor in an axial direction with a wall portion interposed therebetween. Each first terminal includes a first extended portion extending from the stator along the axial direction, and a first fastening portion. Each second terminal includes a second extended portion extending along an extending direction at a portion of the power converter that does not overlap the AC motor in the axial direction; and a second fastening portion. The electric motor case includes a communication hole formed in the wall portion, and a service hole formed in a portion located on an extension line of the fastener parallel to an insertion direction of the fastener.

7 Claims, 10 Drawing Sheets

(56) References Cited

FOREIGN PATENT DOCUMENTS

| JP | 2010051131 A | * | 3/2010 | | |
|----|---|---|---|---|---|
| JP | 2012-109241 A | | 6/2012 | | |
| JP | WO 2014/045747 A1 | | 8/2016 | | |
| JP | 2019-036436 A | | 3/2019 | | |
| WO | WO-2007108049 A1 | * | 9/2007 | ............. | H02K 11/33 |
| WO | WO-2016035476 A1 | * | 3/2016 | ............. | H01R 4/302 |
| WO | 2020/067277 A1 | | 4/2020 | | |

OTHER PUBLICATIONS

Shimizu, Machine Translation of WO2007108049, Sep. 2007 (Year: 2007).*
Takenaka, Machine Translation of JP2010051131, Mar. 2010 (Year: 2010).*
Takahashi, Machine Translation of WO2016035476, Mar. 2016 (Year: 2016).*

* cited by examiner

FIG. 3
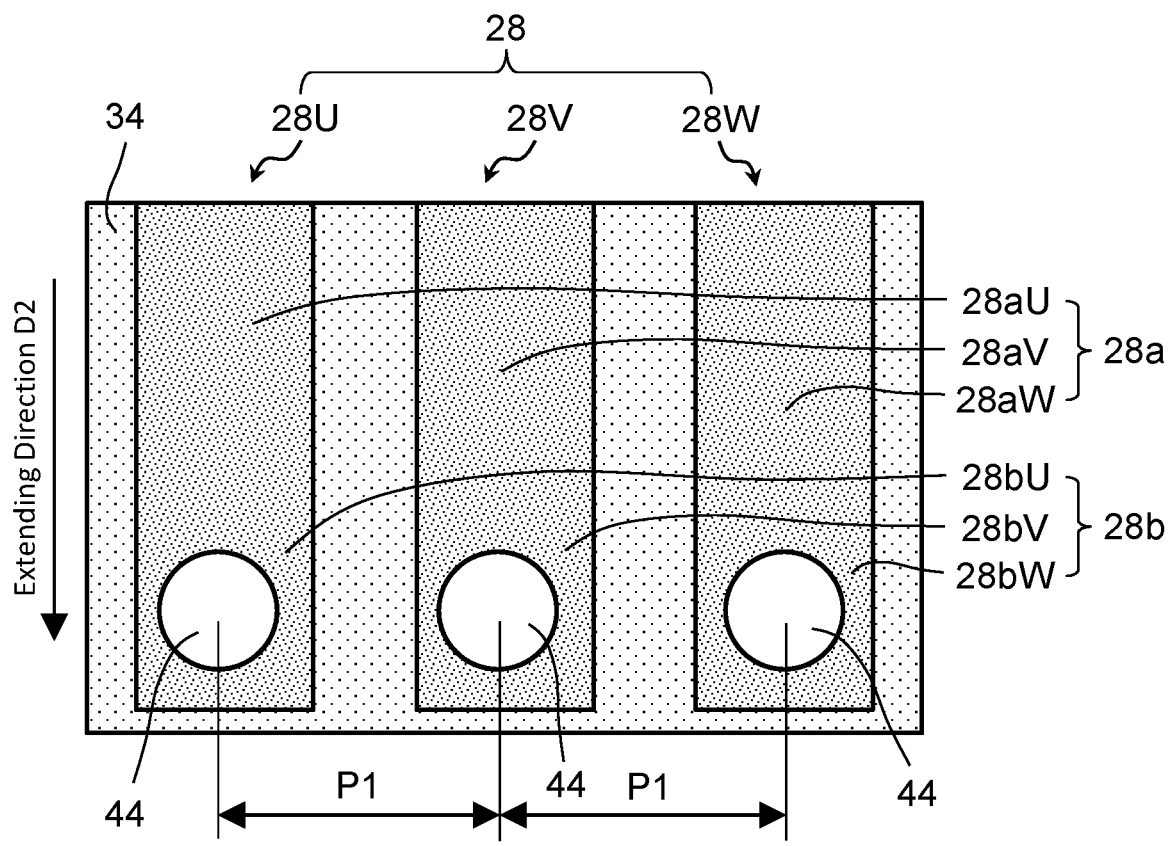
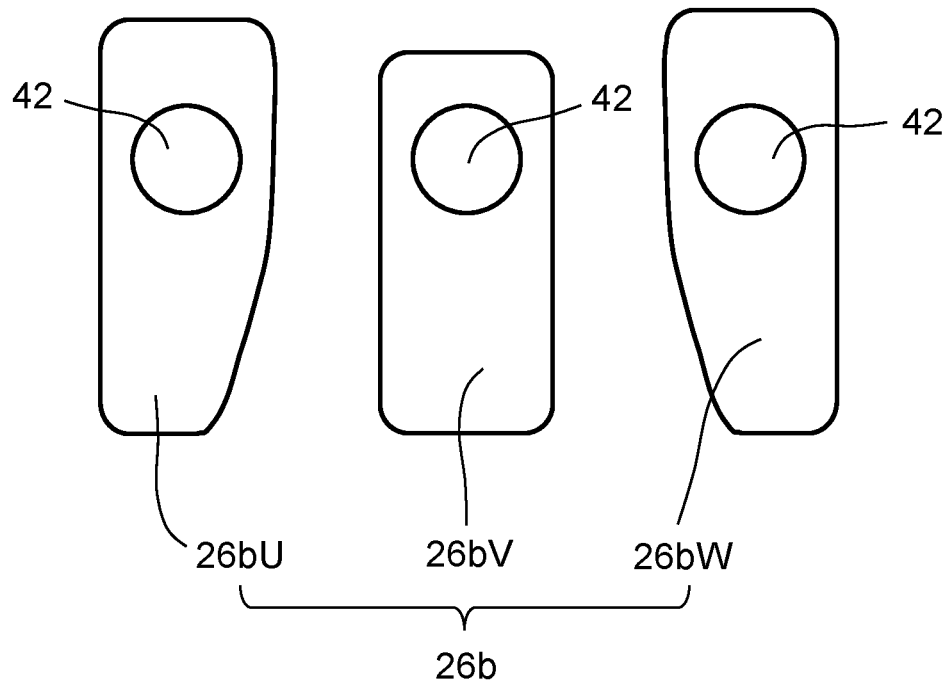

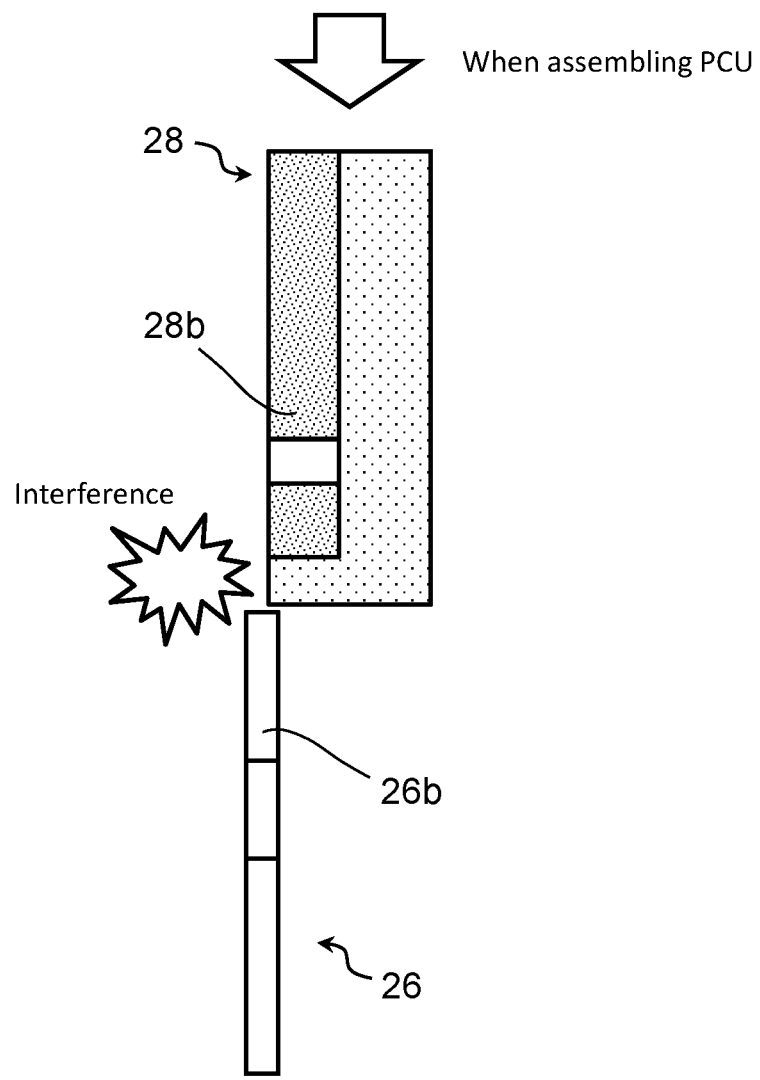

ELECTRIC DRIVE UNIT FOR DRIVING A VEHICLE

CROSS-REFERENCE TO RELATED APPLICATION

The present disclosure claims priority under 35 U.S.C. § 119 to Japanese Patent Application No. 2020-124001, filed on Jul. 20, 2020, which is incorporated herein by reference in its entirety.

BACKGROUND

Technical Field

The present disclosure relates to an electric drive unit, and more particularly, to an electric drive unit suitable for driving a vehicle.

Background Art

JP 2019-036436 A discloses an electric drive unit of a vehicle equipped with two motor generators (MG1 and MG2) and a power control unit (PCU). The PCU is also referred to as a power converter. The MG1 and MG2 are housed in a transaxle case, and the PCU is housed in the PCU case. To be more specific, FIGS. 5 and 6 of JP 2019-036436 A disclose a structure in which the terminals of the MG1 and MG2 and the terminal of the PCU are connected with each other via additional parts. The additional parts mentioned here are two terminal blocks respectively provided on the transaxle case and the PCU case, two connectors respectively connected to the terminal blocks, and cables connecting between the connectors.

SUMMARY

With respect to the electrical connection between an AC motor and a power converter, according to the above-described structure shown in FIGS. 5 and 6 of JP 2019-036436 A, there is a concern that the number of parts may increase and the presence of the above-described additional parts may hinder the miniaturization of the electric drive unit. Also, in view of this kind of issue, when reducing the number of parts and saving space in the structure related to the electrical connection between the AC motor and the power converter, it is favorable not to reduce the replaceability of parts of the power converter.

The present disclosure has been made in view of the problem described above, and an object of the present disclosure is to provide an electric drive unit in which an AC motor and a power converter are electrically connected to reduce the number of parts and save space while improving the replaceability of parts of the power converter.

An electric drive unit according to the present disclosure includes: a multi-phase AC motor including a rotor, a stator, and a plurality of first terminals through which a current of each phase of multi-phase alternating current flows; a power converter including a plurality of second terminals associated with the plurality of first terminals; and an electric motor case that includes a wall portion formed to partition between the AC motor and the power converter, and is formed to house the AC motor. The power converter is fixed to the electric motor case so as to partially overlap the AC motor in an axial direction of the rotor while interposing the wall portion between the power converter and the AC motor. Each of the plurality of first terminals includes: a first extended portion extending from the stator along the axial direction; and a first fastening portion which is a tip of one of the plurality of first terminals. Each of the plurality of second terminals includes: a second extended portion extending along an extending direction at a portion of the power converter that does not overlap the AC motor in the axial direction; and a second fastening portion which is a tip of one of the plurality of second terminals. The extending direction is a direction from the power converter toward an inside of the AC motor in a radial direction. The first fastening portion and the second fastening portion are fastened to each other via a fastener. The electric motor case includes: a communication hole formed in the wall portion to pass the plurality of second terminals; and a service hole formed in a portion located on an extension line of the fastener parallel to an insertion direction of the fastener with respect to the first and second fastening portions.

The AC motor may be a three-phase AC motor. The plurality of first terminals may be three first terminals. The plurality of second terminals may be three second terminals including three second extended portions and three second fastening portions. The three second extended portions may be formed to extend in the extending direction while being gathered so as to narrow a fastening point pitch of the three second fastening portions after being offset from each other in the insertion direction, and may be formed such that fastening points of the three second fastening portions are offset from each other in the extending direction.

The service hole may be circular.

The communication hole may be circular.

The first fastening portion and the second fastening portion may be arranged side by side along the axial direction. The service hole may be formed on an end face of the electric motor case in the axial direction.

In a view of the electric motor case from the axial direction, at least a part of the service hole may overlap the stator.

The electric drive unit may further include an integrally connected washer interposed between a plurality of first fastening portions and the fastener.

The first fastening portion may include a tip portion located on a side of the power converter. The tip portion may be formed so as to be inclined such that a tip position of the tip portion is separated from the second fastening portion to which the first fastening portion is fastened.

According to the electric drive unit of the present disclosure, the plurality of second terminals extending in the extending direction at the portion of the power converter that does not overlap the AC motor in the axial direction of the rotor are fastened to the plurality of first terminals extending along the axial direction from the stator. As a result, the space required for the electrical connection between the AC motor and the power converter can be reduced, and the number of parts for the electrical connection can be reduced. Also, according to the electric drive unit of the present disclosure, the first terminals and the second terminals can be fastened by using the service hole with each of the AC motor and the power converter fixed to the electric motor case. Therefore, replacement of parts of the power converter can be performed while the AC motor is fixed to the electric motor case. Thus, the electric drive unit of the present disclosure is also excellent in the replaceability of parts. As described above, according to the electric drive unit of the present disclosure, it is possible to electrically connect the AC motor and the power converter so as to reduce the number of parts and save space while improving the replaceability of parts of the power converter.

BRIEF DESCRIPTION OF THE DRAWINGS

FIG. 3 is a diagram showing a configuration example of a tip portion of each of stator terminals (first terminals) and PCU terminals (second terminals) shown in FIG. 1;

FIG. 9 is a view used to describe an additional issue when the PCU (power converter) is assembled to an electric motor case;

DETAILED DESCRIPTION

Figure 1:
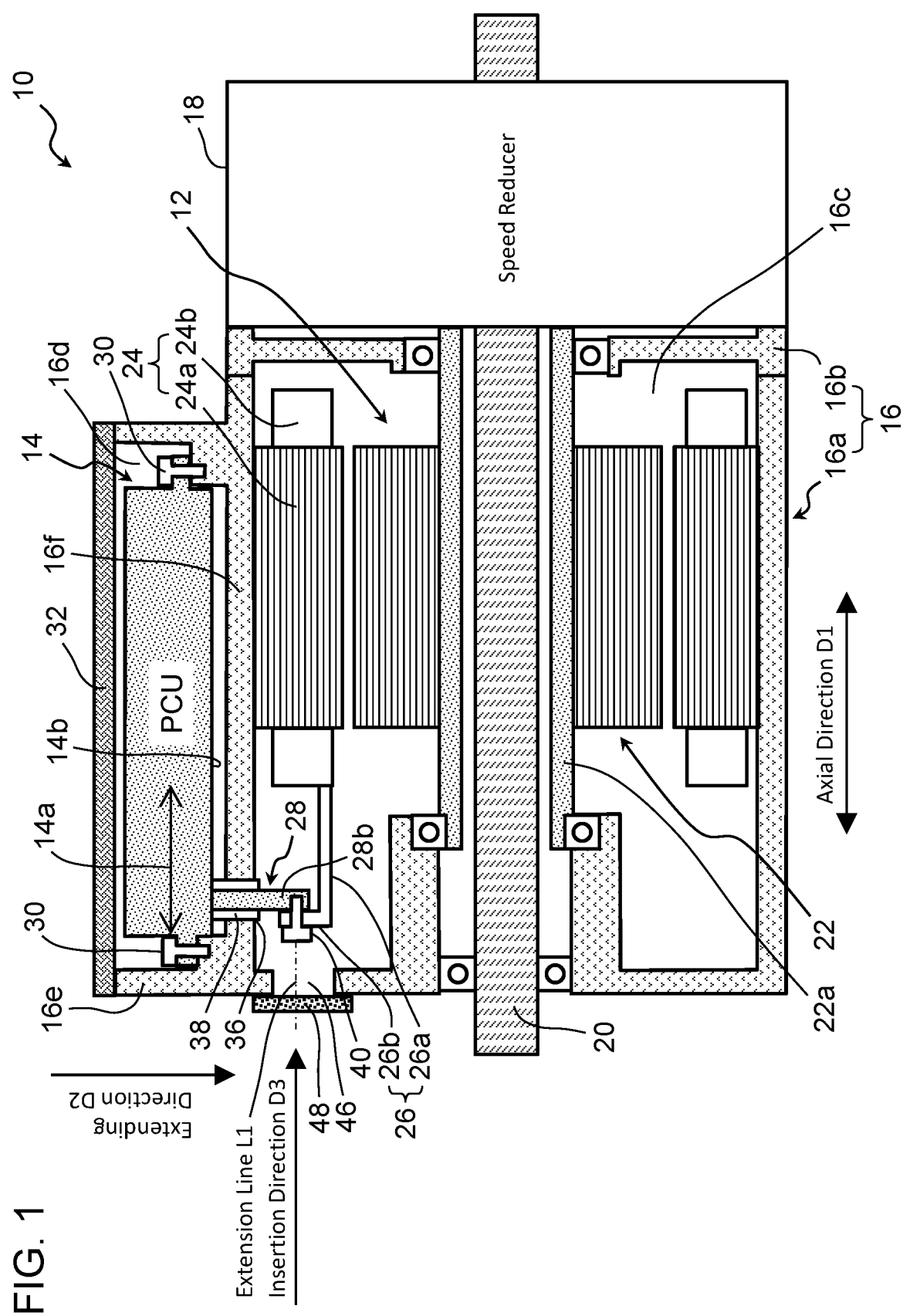
FIG. 1 is a diagram schematically showing a vertical cross section of an electric drive unit according to a first embodiment of the present disclosure.

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment

Figure 2:
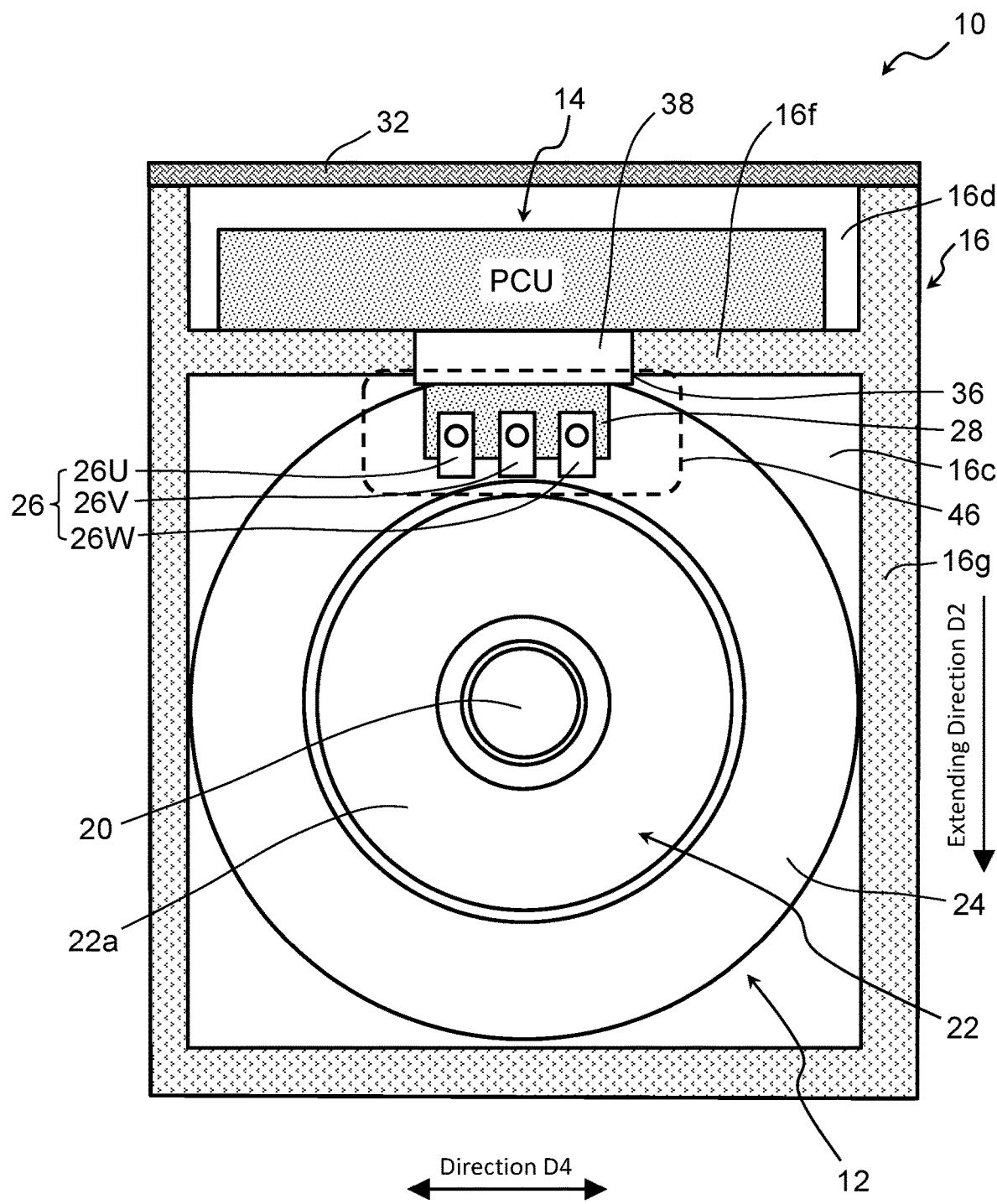
FIG. 2 is a view of an internal structure of the electric drive unit shown in FIG. 1 from the side of a service hole and the axial direction of a rotor.

An electric drive unit 10 according to the first embodiment will be described with reference to FIGS. 1 to 3. FIG. 1 is a diagram schematically showing a vertical cross section of the electric drive unit 10 according to the first embodiment. FIG. 2 is a view of an internal structure of the electric drive unit 10 shown in FIG. 1 from the side of a service hole 46 and the axial direction D1 of a rotor 22.

1-1. Example of Basic Configuration of Electric Drive Unit 10

The electric drive unit 10 is mounted on a vehicle to drive the vehicle, as an example. The electric drive unit 10 includes a three-phase AC motor 12, a power converter 14, and an electric motor case 16.

The AC motor (hereinafter, simply referred to as "motor") 12 includes the rotor 22, a stator 24 located on the outer peripheral side of the rotor 22, and three stator terminals 26. The stator 24 includes a stator core 24a, and a three-phase stator coil 24b wound around the stator core 24a. The stator 24 (stator core 24a) is fixed to the electric motor case 16. The rotor 22 includes a rotor shaft 22a. The rotor shaft 22a is rotatably supported by the electric motor case 16 with respect to the stator 24.

One end of each of the three stator terminals 26 is connected to each of three three-phase coils constituting the stator coil 24b. U-phase, V-phase, and W-phase currents of three-phase alternating current flow through the three stator terminals 26, respectively. Hereinafter, when the stator terminals 26 of the respective phases are described individually, the three stator terminals 26 are referred to as stator terminals 26U, 26V and 26W (see FIG. 2) as necessary. It should be noted that the three-phase AC motor 12 and the three stator terminals 26 correspond to examples of the "multi-phase AC motor" and the "plurality of first terminals" according to the present disclosure, respectively. In addition, the "AC motor" according to the present disclosure may have only a function as an electric motor, or may be configured as a motor generator having a function as a generator as well as a function as an electric motor.

The power converter 14 is configured to control the electric power supplied to the electric motor 12, and is also called a power control unit (PCU). In the following description, the power converter 14 is also referred to as "PCU 14". The PCU 14 includes an inverter equipped with electronic components such as a power semiconductor module. In other words, the PCU 14 is an assembly of electronic devices such as the inverter.

The PCU 14 has three PCU terminals 28 associated with the three stator terminals 26 on the electric motor 12 side. More specifically, the three PCU terminals 28 correspond to the U-phase, V-phase, and W-phase output terminals of the power semiconductor module included in the PCU 14. The three PCU terminals 28 are referred to as PCU terminals 28U, 28V, and 28W (see FIG. 3) as necessary. It should be noted that the three PCU terminals 28 correspond to an example of the "plurality of second terminals" according to the present disclosure.

The electric motor 12 is housed in the electric motor case 16. The structure of the electric motor case 16 is not particularly limited, but in the example shown in FIG. 1, the electric motor case 16 is configured as follows. That is, the electric motor case 16 is formed by a cylindrical case 16a formed in a bottomed cylindrical shape, and a plate-shaped cover 16b fixed to the cylindrical case 16a so as to close an open end of the cylindrical case 16a. More specifically, instead of the square or rectangular cylindrical shape shown in FIG. 2, the cylindrical case 16a may be formed in a circular cylindrical shape, for example.

Furthermore, in the example shown in FIG. 1, the electric motor case 16 integrally includes a PCU chamber 16d formed to house the PCU 14 together with a motor chamber 16c formed to house the electric motor 12. The PCU 14 is fixed to the electric motor case 16 by fasteners (for example, fastening bolts) while being housed in the PCU chamber 16d. In this example, the case that houses the PCU 14 is formed by a wall portion of the cylindrical case 16a that forms the PCU chamber 16d, and a PCU cover 32 that closes an opening of the wall portion. As in this example, the PCU 14 (i.e., the assembly of the electronic devices which are components of the PCU 14) may be directly fastened to the electric motor case 16. Alternatively, in another example, the PCU 14 may be housed in a dedicated PCU case that houses the PCU 14, and may be fastened to an electric motor case via this PCU case.

It should be noted that, in the example shown in FIG. 1, the electric drive unit 10 also integrally includes a speed reducer 18. In this example, the rotor shaft 22*a* of the rotor 22 of the electric motor 12 is arranged coaxially with the speed reducer 18 and a drive shaft 20 of the vehicle. More specifically, the rotor shaft 22*a* is connected to the drive shaft 20 via the speed reducer 18 and is not in direct contact with the drive shaft 20. That is, the torque output from the electric motor 12 is transmitted to the drive shaft 20 after being increased by the speed reducer 18. When the drive shaft 20 is inserted into the rotor shaft 22*a* of the electric motor 12 as in this example, oil used for lubrication of the speed reducer 18 can be used for cooling the electric motor 12. However, the "electric drive unit" according to the present disclosure is not limited to the one provided with a speed reducer integrally as in this kind of example.

1-2. Terminal Structure of AC Motor and Power Converter

In the following description, FIG. 3 is referred to along with FIGS. 1 and 2 described above. FIG. 3 is a diagram showing a configuration example of a tip portion of each of the stator terminals 26 and the PCU terminals 28 shown in FIG. 1.

Each of the three stator terminals 26 includes an extended portion 26*a* extending from the stator 24 along the axial direction D1 of the rotor shaft 22*a*, and a fastening portion 26*b* that is a portion following the extended portion 26*a* and is a tip of each stator terminal 26. More specifically, as shown in FIG. 1, the extended portion 26*a* is formed so as to extend along the axial direction D1 from a portion of the stator coil 24*b* located on the opposite side of speed reducer 18 in the axial direction D1 toward an end face 16*e* of the electric motor case 16 located on the opposite side of the speed reducer 18 in the axial direction D1.

In addition, in the example shown in FIG. 1, each of the stator terminals 26 extends linearly along the axial direction D1 in the extended portion 26*a*, and is then bent such that the fastening portion 26*b* following the extended portion 26*a* faces in the axial direction D1. It should be noted that, although it is favorable that the extended portion 26*a* has this kind of straight shape in order to shorten the length of each stator terminal 26, the extended portion 26*a* is not necessarily limited to a perfect straight shape as long as it extends along the axial direction D1.

The extended portion 26*a* of each of the stator terminals 26 is a power line made of metal (typically made of copper). A specific example of the extended portion 26*a* is a copper bar that is coated with enamel and has adequate rigidity, and the cross-sectional shape of the extended portion 26*a* is, for example, a square or a circle. Instead of this kind of example, the extended portion 26*a* may be formed of, for example, a copper cable which is covered with an insulating member and whose shape deformation is limited.

The fastening portions 26*b* of the stator terminals 26 (26*b*U, 26*b*V, and 26*b*W) are made of metal (typically made of copper) and are formed in a plate shape. In the example shown in FIG. 1, each of the fastening portions 26*b* is formed continuously (i.e., integrally) with the extended portion 26*a* which is a copper bar. Moreover, in an example in which the extended portion 26*a* is formed of a copper cable as described above, the fastening portion 26*b* may be formed as a terminal fitting connected to the tip of each stator terminal 26 by a method such as caulking or welding (for example, the configuration shown in FIG. 4 described below corresponds thereto). It should be noted that the extended portion 26*a* and the fastening portion 26*b* of each stator terminal 26 correspond to examples of the "first extended portion" and the "first fastening portion" according to the present disclosure, respectively.

The PCU 14 is fixed to the electric motor case 16 with the electric motor 12 housed in the electric motor case 16 (motor chamber 16*c*) as shown in FIG. 1. As shown in FIG. 1, the PCU 14 is fixed to the electric motor case 16 so as to partially overlap the electric motor 12 in the axial direction D1. In other words, the PCU 14 has a portion 14*a* that does not overlap the electric motor 12 in the axial direction D1. This portion 14*a* is on the side of the stator terminals 26 with respect to the stator 24 (i.e. on the opposite side of the speed reducer 18) in the axial direction D1.

Each of the three PCU terminals 28 includes an extended portion 28*a* and a fastening portion 28*b*. The direction toward the inside of the electric motor 12 in the radial direction from the PCU 14 (more specifically, from the power semiconductor module in the PCU 14) is herein referred to as "extending direction D2". As shown in FIG. 1, each of the extended portions 28*a* is formed so as to extend in the extending direction D2 at the portion 14*a* which does not overlap the electric motor 12 in the axial direction D1. In the example of the PCU terminals 28 shown in FIG. 3, this extending direction D2 is the same as the length direction of the PCU terminals 28, and is orthogonal to the axial direction D1.

In addition, each of the extended portions 28*a* extends toward the side of the electric motor 12 from a bottom surface 14*b* of the PCU 14 (i.e., a surface of the PCU 14 located on the side facing the electric motor 12). The fastening portion 28*b* is a portion following the extended portion 28*a* and is a tip of each PCU terminal 28. In particular, in the example shown in FIG. 3, each of the PCU terminals 28 (the extended portion 28*a* and the subsequent fastening portion 28*b*) extends linearly along the extending direction D2 without bending in the middle toward the side of the electric motor 12. A fastening point pitch P1 in FIG. 3 will be described below for comparison with a second embodiment described below.

The extended portions 28*a* (28*a*U, 28*a*V, and 28*a*W) and the fastening portions 28*b* (28*b*U, 28*b*V, and 28*b*W) of the PCU terminals 28 are made of metal (typically made of copper), and are continuously (integrally) formed in a plate shape as shown in FIG. 3. In addition, in the present embodiment, the PCU terminals 28 are arranged in a row, and are formed so as to extend linearly from its base end on the PCU 14 (power semiconductor module) side to its tip (i.e., the fastening portion 28*b*). Moreover, in the present embodiment, the three PCU terminals 28 are provided together with one (common) protective member 34 made of resin. This protective member 34 is formed so as to fill the periphery of each of the PCU terminals 28 except for the surface on the side where the stator terminals 26 are fastened. However, the three PCU terminals 28 may be arranged without this kind of protective member 34. It should be noted that the extended portion 28*a* and the fastening portion 28*b* of each PCU terminal 28 correspond to examples of the "second extended portion" and the "second fastening portion" according to the present disclosure, respectively.

Moreover, the electric motor case 16 is provided with a wall portion (partition wall) 16*f* that is formed to partition between the motor chamber 16*c* and the PCU chamber 16*d*. This wall portion 16*f* includes a communication hole 36 that is formed to pass the three PCU terminals 28. Although this kind of shape of the communication hole 36 is not particularly limited, the communication hole 36 has a rounded rectangle shape, similarly to the service hole 46 described below as an example. The electric drive unit 10 is provided with a seal member 38 for filling a gap between the wall portion 16*f* and the PCU terminals 28 in this communication hole 36. This is to prevent the oil introduced into the motor chamber 16*c* for cooling of the electric motor 12 as described above from flowing into the PCU chamber 16*d*. Because of this, in an example of another electric drive unit that does not use oil in the motor chamber 16*c*, installation of the seal member is not necessarily required.

The fastening portion 26*b* of each phase of the stator terminals 26 is fastened to the fastening portion 28*b* of the PCU terminal 28 of the same phase via a fastener (for example, via a fastening bolt 40 (see FIG. 1)). Specifically, as shown in FIG. 3, fastening holes 42 and 44 into which the fastening bolt 40 is inserted are respectively formed in the fastening portions 26*b* and 28*b* of each phase. Moreover, a screw hole (not shown) for fixing the fastening bolt 40 is formed in the protective member 34 that covers the PCU terminals 28. It should be noted that, in the example without the protective member 34, a nut for fixing the fastening bolt 40 may be provided on the back surface side of the fastening portion 28*b* by a method such as welding, or, the fastening hole 44 of the fastening portion 28*b* may be threaded.

The electric motor case 16 is provided with the service hole 46 used for work for fastening the stator terminals 26 and the PCU terminals 28. The service hole 46 is formed in a portion of the electric motor case 16 located on an extension line L1 of the fastening bolt 40 parallel to an insertion direction D3 of the fastening bolt 40 with respect to the fastening portions 26*b* and 28*b*. The service hole 46 is closed by a hole cap 48 except during work.

More specifically, in the present embodiment, the insertion direction D3 of the fastening bolt 40 is the same as the axial direction D1 as shown in FIG. 1. That is, in the present embodiment, the extension line L1 of the fastening bolt 40 (fastener) extends toward the end face 16*e* of the electric motor case 16 in the axial direction D1, and therefore, the service hole 46 is formed in the end face 16*e*. The shape of the service hole 46 is not particularly limited, but is, for example, a rounded rectangle. In addition, when the electric motor case 16 is viewed from the axial direction D1, a part of the service hole 46 (more specifically, the most part thereof) overlaps with the stator 24 as shown in FIG. 2. It should be noted that the service hole 46 may be formed such that the entire service hole 46 overlaps with the stator 24 when viewed from the axial direction D1.

Furthermore, in the present embodiment, as shown in FIG. 1, the fastening portion 26*b* of each stator terminal 26 and the fastening portion 28*b* of each PCU terminal 28 are arranged side by side along the axial direction D1. More specifically, in the arrangement example shown in FIG. 1, the fastening portions 26*b* and 28*b* are arranged along the axial direction D1 in the order in which the fastening portion 26*b* of the stator terminal 26 is closer to the fastening bolt 40 than the fastening portion 28*b* of the PCU terminal 28.

1-3. Effect

As described above, according to the electric drive unit 10 of the present embodiment, the three PCU terminals 28 extending from the PCU 14 in the extending direction D2 at the portion 14*a* which does not overlap the electric motor 12 in the axial direction D1 (i.e., the three PCU terminals 28 extending toward the inside of the electric motor 12 in the radial direction) are fastened to the stator terminals 26 extending along the axial direction D1 from the stator 24. More specifically, the PCU terminals 28 are fastened directly (i.e., without any additional parts) to the stator terminals 26. As a result, the space required for the electrical connection between the electric motor 12 and the PCU 14 can be reduced, and the number of parts for the electrical connection can be reduced. Also, according to the electric drive unit 10, the stator terminals 26 and the PCU terminals 28 can be fastened by using the service hole 46 with each of the electric motor 12 and the PCU 14 fixed to the electric motor case 16. Therefore, replacement of the PCU 14 (more specifically, replacement of the assembly of the electronic parts that make up the PCU 14, or replacement of individual parts (e.g., power semiconductor module) of the PCU 14) can be performed while the electric motor 12 is fixed to the electric motor case 16. Thus, the electric drive unit 10 is also excellent in the replaceability of parts.

As described above, according to the electric drive unit 10 of the present embodiment, it is possible to electrically connect the AC motor 12 and the power converter 14 so as to reduce the number of parts and save space while improving the replaceability of parts of the power converter (PCU) 14.

Furthermore, in the present embodiment, the fastening portion 26*b* of each stator terminal 26 and the fastening portion 28*b* of each PCU terminal 28 are arranged side by side along the axial direction D1 (see FIG. 1). In addition, the fastening holes 42 and 44 of these fastening portions 26*b* and 28*b* are oriented in the axial direction D1 (in other words, the insertion direction D3 of the fastening bolt 40 is parallel to the axial direction D1). Also, the service hole 46 is formed on the end face 16*e* of the electric motor case 16 in the axial direction D1. According to this kind of specific example of forming the stator terminals 26 and the PCU terminals 28, the PCU terminals 28 can be fastened to the stator terminals 26 while avoiding the complicated shape of the PCU terminals 28, in the example in which the power semiconductor module is arranged in the PCU 14 in a direction in which the insertion direction D3 is parallel to the axial direction D1 when the PCU terminals 28 are extended from the PCU 14 toward the electric motor 12 (see FIG. 1).

1-4. Modification Examples

In the arrangement example according to the first embodiment described above (see FIG. 1), the fastening portions 26*b* and 28*b* are arranged along the axial direction D1 in the order in which the fastening portion 26*b* of the stator terminal 26 is closer to the fastening bolt 40 than the fastening portion 28*b* of the PCU terminal 28. However, contrary to this arrangement example, the stator terminal may be formed such that the fastening portions 26*b* and 28*b* are arranged side by side along the axial direction D1 in the order in which the fastening portion 28*b* of the PCU terminal 28 is closer to the fastening bolt 40 than the fastening portion 26*b*.

Moreover, in the first embodiment, the insertion direction D3 of the fastening bolt 40 (fastener) is the same as (i.e., parallel to) the axial direction D1 as shown in FIG. 1. Because of this, in the first embodiment, the extension line L1 of the fastening bolt 40 parallel to the insertion direction D3 extends toward the end face 16*e* of the electric motor case 16 in the axial direction D1, and therefore, the service hole 46 is formed on the end face 16e. However, the "insertion direction of the fastener" according to the present disclosure is not necessarily the same as the axial direction D1 (i.e., the axial direction of the rotor). That is, the "insertion direction" may be, for example, a direction orthogonal to the axial direction D1 (e.g., a direction D4 in FIG. 2). Therefore, the service hole may be formed in the electric motor case at a portion located on the extension line of the fastener parallel to the "insertion direction" which is not the same as the axial direction (e.g., a side wall portion 16g in FIG. 2).

2. Second Embodiment

Next, an electric drive unit 50 according to a second embodiment will be described with reference to FIGS. 4 to 6.

2-1. Terminal Structure

The electric drive unit 50 is different from the electric drive unit 10 according to the first embodiment described above in each shape of the stator terminals (first terminals), the PCU terminals (second terminals), the service hole, and the communication hole between the electric motor and the PCU.

Figure 4:
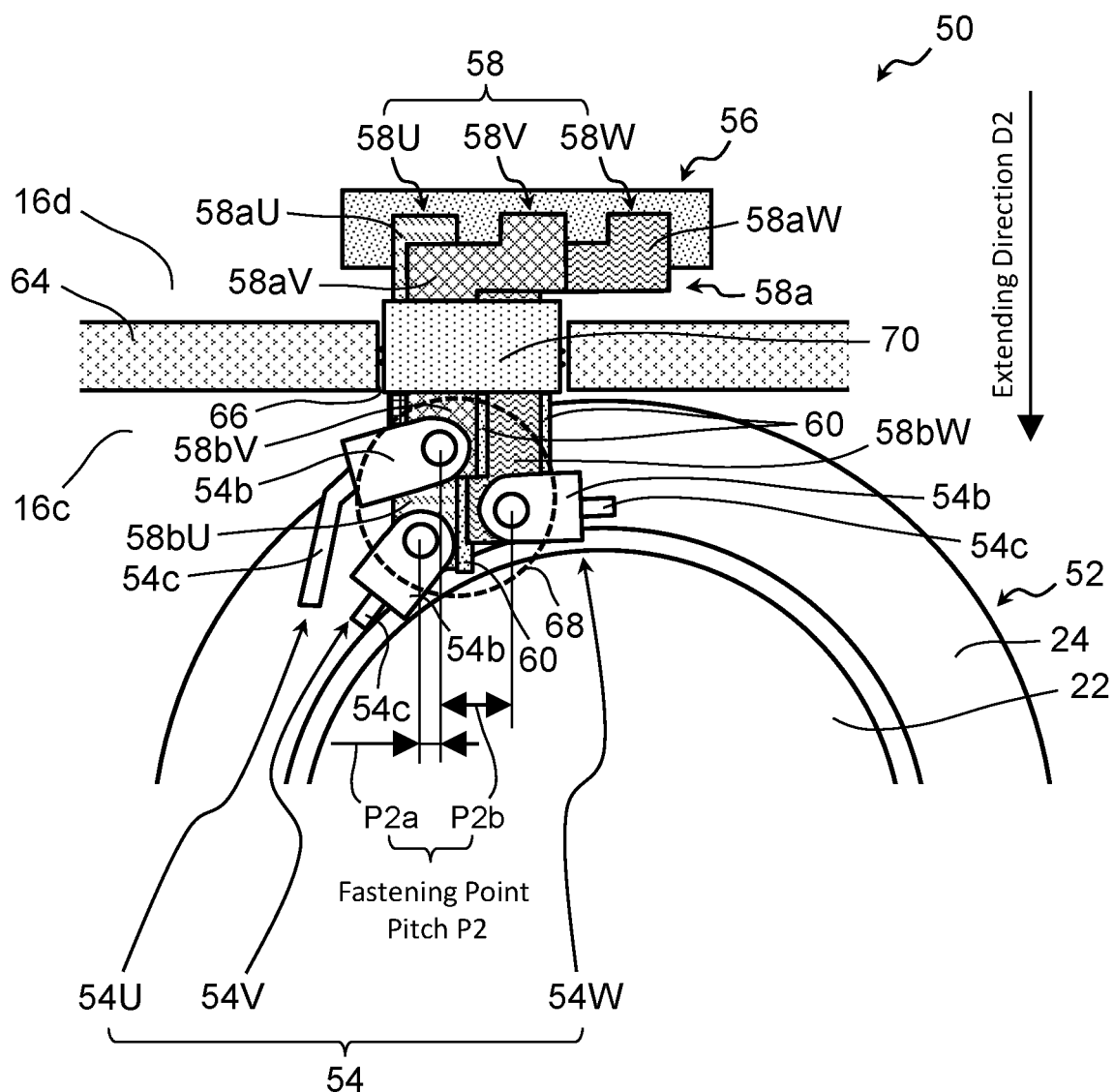
FIG. 4 is a view of an internal structure of an electric drive unit according to a second embodiment when seen from a service hole side and the axial direction of the rotor.

FIG. 4 is a view of an internal structure of the electric drive unit 50 according to the second embodiment when seen from a service hole 68 side and the axial direction D1 of the rotor 22. FIG. 5 is a view of PCU terminals 58 shown in FIG. 4 when seen from the outside of an electric motor 52 in the radial direction (i.e., the upper side in FIG. 4). FIG. 6 is a view of the PCU terminals 58 shown in FIG. 4 when seen from the inside of the electric motor 52 in the radial direction (i.e., the lower side in FIG. 4) contrary to FIG. 5.

The three-phase AC motor 52 according to the present embodiment is provided with three stator terminals 54 (54U, 54V, and 54W) together with the rotor 22 and the stator 24. Each of the stator terminals 54 includes not only an extended portion (not shown) extending along the axial direction D1 from the stator 24, and a fastening portion 54b that is a tip of each stator terminal 54, but also a portion 54c connecting the extended portion and the fastening portion 54b. It should be noted that, in FIGS. 5 and 6, the illustration of the stator terminals 54 is omitted.

On the other hand, a power converter (PCU) 56 according to the present embodiment is provided with three PCU terminals 58 (58U, 58V, and 58W). As shown in FIGS. 4 to 6, when extending in the extending direction D2 (more specifically, toward the inside of the electric motor 52 in the radial direction), three extended portions 58a of the three PCU terminals 58 are offset from each other in the insertion direction D3 (see FIG. 5) of the fastening bolt 40 (fastener). After that, the three extended portions 58a are gathered together such that fastening point pitches P2 (P2a and P2b) of three fastening portions 58b are narrowed. In other words, the insertion direction D3 corresponds to the thickness direction of the fastening portion 58b.

Figure 5:
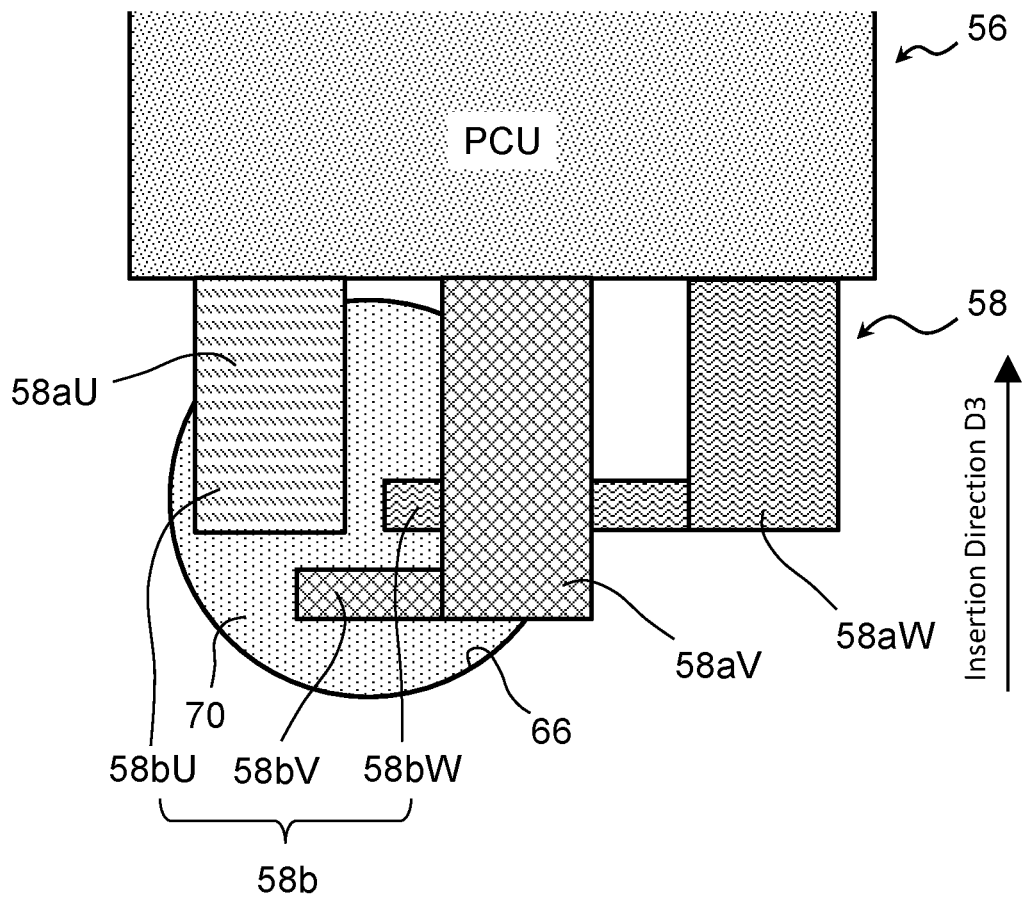
FIG. 5 is a view of PCU terminals shown in FIG. 4 when seen from the outside of an AC motor in the radial direction.

More specifically, in the example shown in FIG. 5, one extended portion 58aV is offset with respect to the remaining extended portions 58aU and 58aW. Instead of this kind of example, the three extended portions 58a may be offset from each other such that their respective positions in the insertion direction D3 are different. Then, after being offset in this way, the three extended portions 58a are gathered such that the fastening point pitch P2 (P2a and P2b) of the three fastening portions 58b is narrower than the fastening point pitch P1 in the example (see FIG. 3) in which the PCU terminals 28 extend linearly.

The three extended portions 58a are further formed such that the fastening points of the three fastening portions 58b are offset from each other in the extending direction D2 of the electric motor 52 while being gathered as described above. More specifically, in the example shown in FIG. 4, the positions of the fastening points of the three fastening portions 58b are offset from each other in the extending direction D2, but instead of this kind of example, one fastening point may be offset in the extending direction D2 with respect to the remaining two fastening points.

Figure 6:
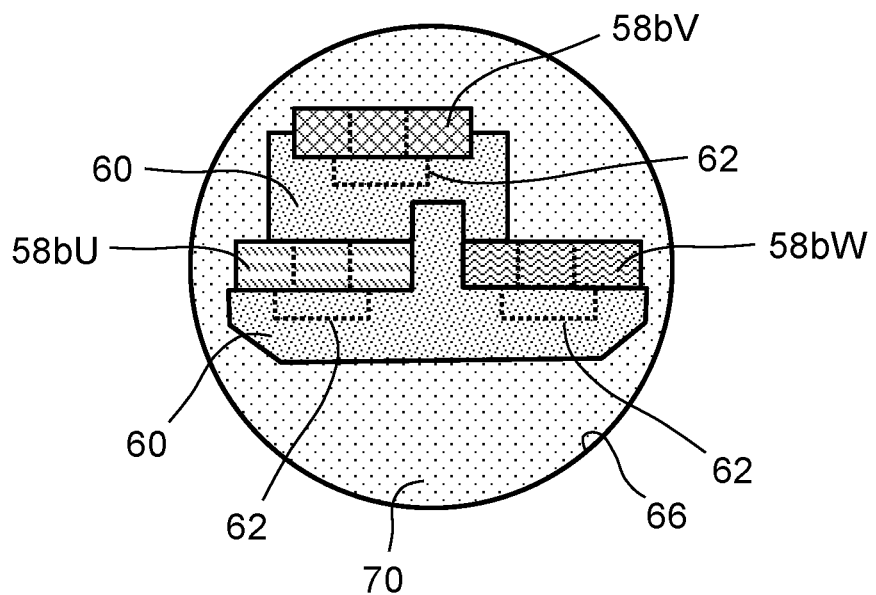
FIG. 6 is a view of the PCU terminals shown in FIG. 4 when seen from the inside of the AC motor in the radial direction.

As shown in FIGS. 4 and 6, the PCU terminals 58 are covered by a protective member 60, similarly to the PCU terminals 28 according to the first embodiment. Also, as shown in FIG. 6, screw holes 62 for fixing the fastening bolts (not shown) are formed in the protective member 60.

An electric motor case 64 is provided with a communication hole 66 for passing the PCU terminals 58 from the PCU chamber 16d to the motor chamber 16c. Also, as shown in FIG. 4, the PCU terminals 58 pass through the communication hole 66 at the respective portions of the extended portions 58a extending while gathering the extended portions 58a such that the fastening point pitch P2 becomes narrow as described above.

The service hole 68 (see FIG. 4) used for fastening the stator terminals 54 and the PCU terminals 28 is formed in the electric motor case 64. Broadly speaking, the shape of the service hole 68 is not particularly limited, but in the present embodiment, the service hole 68 is circular as shown in FIG. 4. It should be noted that, in FIG. 4, the illustration of a hole cap that closes this service hole 68 is omitted.

Moreover, broadly speaking, the shape of the communication hole 66 is also not particularly limited, but in the present embodiment, the communication hole 66 is also circular as shown in FIGS. 5 and 6. Furthermore, in the present embodiment, similarly to the first embodiment, the communication hole 66 is provided with a seal member 70 for filling a gap between the electric motor case 64 and the PCU terminals 58. More specifically, the type of the seal member 70 is not particularly limited, but a filler plug made of an elastic material such as rubber is used here as an example of the seal member 70.

2-2. Effect

If the service hole is large, there is a concern that the strength of the electric motor case may decrease, and there is also a concern that the cost of the hole cap that closes the service hole may increase. Moreover, if the communication hole is large because the space of the PCU terminals at the position where the PCU terminals pass through the electric motor case is large, there is similarly a concern that the strength of the electric motor case may decrease. Furthermore, in the example provided with the seal member that closes the communication hole as in the second embodiment, if the communication hole is large, there is a concern that the cost of the seal member may increase.

In view of the additional issue described above, according to the electric drive unit 50 of the present embodiment, the three extended portions 58a of the three PCU terminals 58 are formed so as to be offset from each other in the insertion direction D3 (see FIG. 5) and then to be gathered so as to narrow the fastening point pitch P2 of the three fastening portions 58b, and are further formed such that the fastening points of the three fastening portions 58b are offset from each other in the extending direction D2 (see FIG. 4) of the electric motor 52. According to this kind of configuration, as compared with the example of the PCU terminals 28 according to the first embodiment (see FIG. 3), the space around the three fastening portions 58b, and the space of the three extended portions 58a at the positions where the three extended portions 58a pass through the communication hole 66 can be reduced. This is effective in reducing the size of the service hole 68 and the communication hole 66. Then, by downsizing the service hole 68 and the communication hole 66, it is possible to achieve an electrical connection between the stator terminals 54 and the PCU terminals 58 while reducing a decrease in strength of the electric motor case 64 due to the presence of the service hole 68 and the communication hole 66. Moreover, by downsizing the service hole 68 and the communication hole 66, it is possible to reduce an increase in the cost of the hole cap that closes the service hole 68 and the seal member 70 that closes the communication hole 66.

Furthermore, in the present embodiment, the service hole 68 and the communication hole 66 are circular. If the space around the three fastening portions 58b and the space of the three extended portions 58a at the positions where the three extended portions 58a pass through the communication hole 66 are reduced as a result of the PCU terminals 58 being configured as described above, it is possible to suitably miniaturize the service hole 68 and the communication hole 66 while adopting a circular shape as the shape of these holes 68 and 66, as can be seen from FIGS. 4 and 5. In addition, the circular shape of the service hole 68 and the communication hole 66 simplifies the structure of the hole cap and the seal member 70, and also facilitates their manufacture and assembly. This also leads to a reduction in the cost of the electric drive unit 50.

3. Third Embodiment

Next, an electric drive unit according to a third embodiment will be described with reference to FIGS. 7 and 8.

3-1. Terminal Structure

Figure 7:
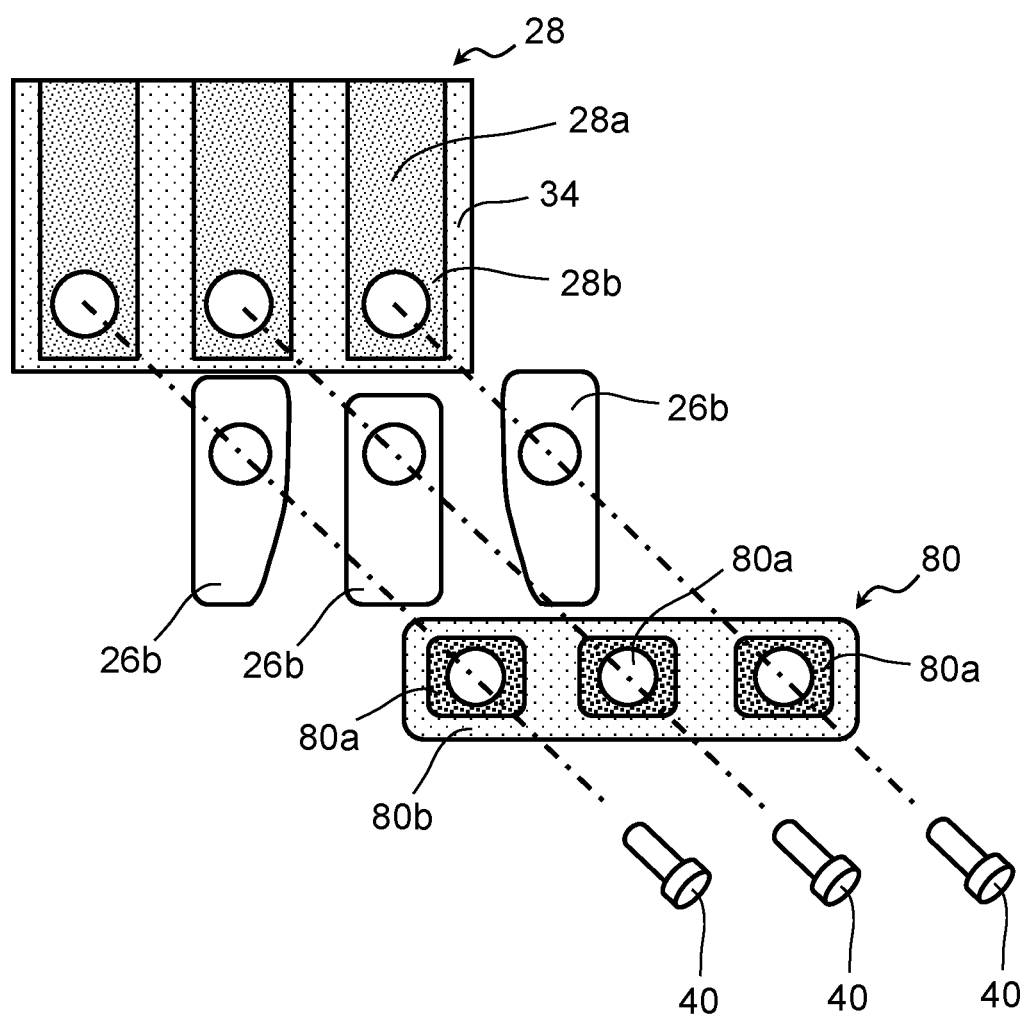
FIG. 7 is a diagram used to describe a terminal fastening structure in an electric drive unit according to the third embodiment of the present disclosure.

FIG. 7 is a diagram used to describe a terminal fastening structure in the electric drive unit according to the third embodiment. The electric drive unit according to the present embodiment is different from the electric drive unit 10 according to the first embodiment described above in that an integrally connected washer 80 is additionally provided.

For example, in the configuration of the first embodiment, when the stator terminals 26 and the PCU terminals 28 are fastened by using the service hole 46, the fastening torque of the fastening bolt 40 acts to rotate the fastening portion 26b of the stator terminal 26 with respect to the fastening portion 26b. As a result, there is a concern that stress may be generated in the stator terminal 26 (typically, in the joint portion between the fastening portion 26b and the extended portion 26a) and the stator terminal 26 may be bent. In addition, this kind of issue similarly occurs in an example (not shown) in which an independent washer is interposed between each fastening portion 26b and the fastening bolt 40 for each fastening portion 26b. This is because the fastening torque of the fastening bolt 40 acts to rotate the fastening portion 26b together with the washer.

In view of the additional issue described above, in the present embodiment, as shown in FIG. 7, the integrally connected washer 80 is interposed between each fastening portion 26b (first fastening portion) of the stator terminals 26 and the fastening bolt 40 (fastener). The integrally connected washer 80 is configured by three metal washer portions 80a respectively associated with the three fastening portions 26b, and a resin portion 80b for integrally connecting these three washer portions 80a. That is, the washer 80 is formed by integrally molding the three washer portions 80a with the resin portion 80b. This integrally connected washer 80 is also referred to as three hole washer 80.

Fastening of the stator terminals 26 and the PCU terminals 28 with the integrally connected washer 80 having the configuration described above can be performed, for example, as follows. That is, first, after the electric motor 12 is housed in the electric motor case 16, the PCU 14 is fixed to the electric motor case 16. As a result, a state is obtained in which the fastening portion 26b of each of the stator terminals 26 overlaps the fastening portion 28b of each of the PCU terminals 28. In this state, the integrally connected washer 80 is inserted into the service hole 46 and then overlapped with the stator terminals 54 by the hands of the operator or by using an auxiliary tool for assembly. Then, the stator terminals 26 and the PCU terminals 28 are fastened by the fastening bolts 40 with the integrally connected washer 80 interposed therebetween.

3-2. Effect

According to the electric drive unit of the present embodiment, by the use of the integrally connected washer 80 described above, it is possible to fasten the stator terminals 26 and the PCU terminals 28 while preventing the stator terminals 26 from bending. Specifically, for example, at the time of fastening, the fastening bolt 40 is temporarily fixed to the screw hole of a pair of fastening portions 26b and 28b first. Next, the fastening of another pair of fastening portions 26b and 28b is completed, and then the fastening of the remaining pair of fastening portions 26b and 28b is completed. In this way, by temporarily fixing, for example, one pair of the fastening portions 26b and 28b, the integrally connected washer 80 can be prevented from rotating due to the fastening torque when fastening the remaining pairs of the fastening portions 26b and 28b. As a result, fastening can be performed while preventing the fastening torque from acting so as to rotate the stator terminals 26. It should be noted that the fastening method is not limited to this method, and for example, the fastening of the three pairs of fastening portions 26b and 28b may be completed in a predetermined order after the three fastening bolts 40 are temporarily fixed first.

3-3. Other Configuration Examples Related to Third Embodiment

The integrally connected washer according to the third embodiment may be combined with the stator terminals 54 according to the second embodiment instead of the stator terminals 26 according to the first embodiment. Specifically, an integrally connected washer formed to match the positions of the respective fastening points of the three fastening portions 54b (see FIG. 4) may be used.

Figure 8A:
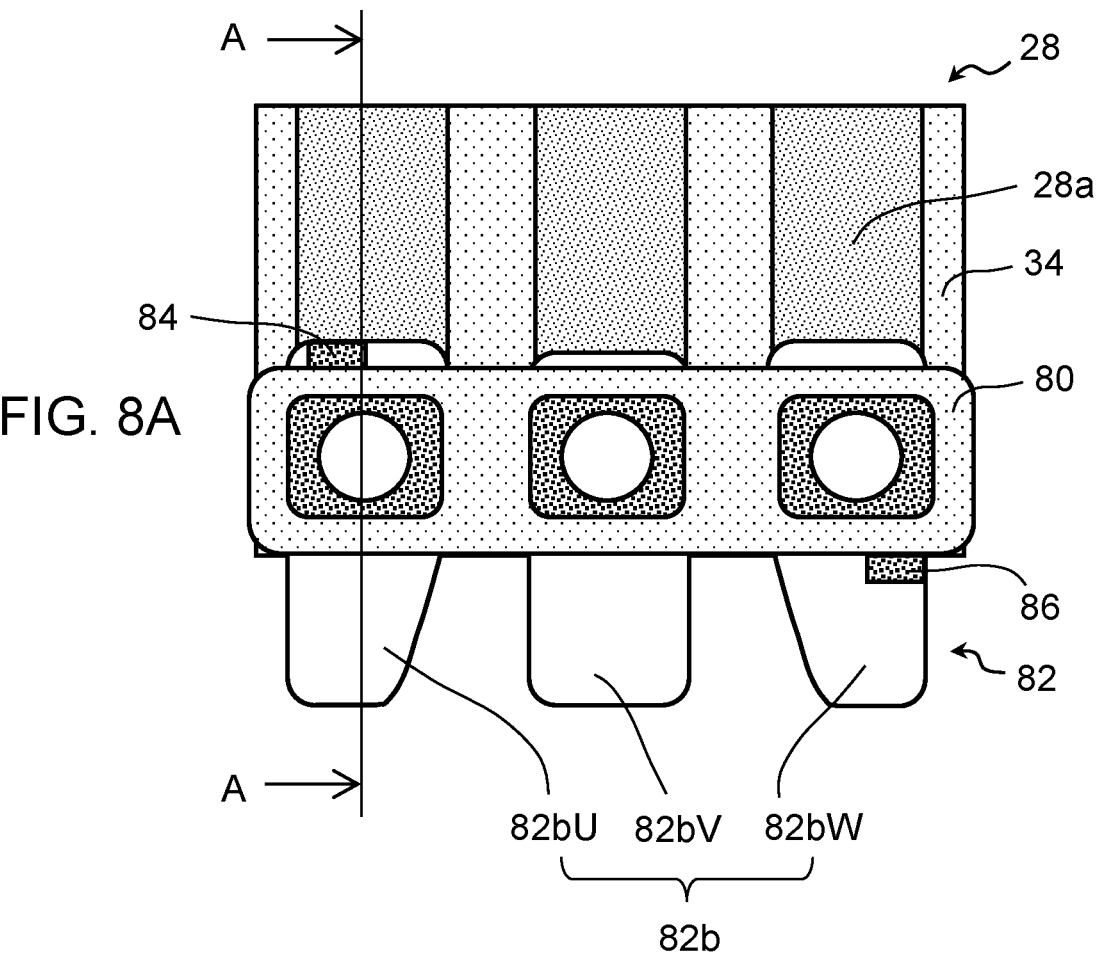
FIG. 8A is a diagram used to describe another example of the terminal structure using an integrally connected washer according to the third embodiment.
Figure 8B:
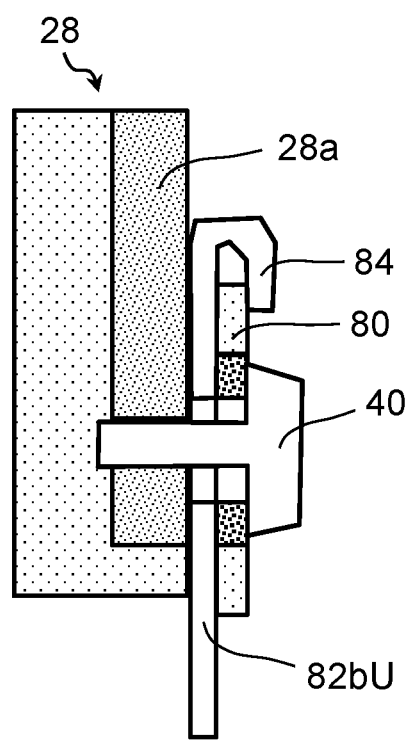
FIG. 8B is a diagram used to describe another example of the terminal structure using the integrally connected washer according to the third embodiment.

FIGS. 8A and 8B are diagrams used to describe another example of the terminal structure using the integrally connected washer 80 according to the third embodiment. More specifically, FIG. 8B is a cross-sectional view obtained by cutting the PCU terminals 28, the integrally connected washer 80, and one of stator terminals 82 along a line A-A (i.e., a line passing through the center of the fastening hole) in FIG. 8A.

In the example shown in FIG. 8A, the stator terminals 82 includes fastening portions 82b (82bU, 82bV, and 82bW). The two fastening portions 82bU and 82bW of the three fastening portions 82b are formed with protrusions 84 and 86, respectively. These protrusions 84 and 86 are formed so as to be able to hold the integrally connected washer 80 as shown in FIGS. 8A and 8B, and are formed at positions that hinder the rotation of the integrally connected washer 80 when the fastening torque of the fastening bolt 40 acts on the integrally connected washer 80.

As described above, the stator terminals 82 can hold the integrally connected washer 80 by using the protrusions 84 and 86. Because of this, the integrally connected washer 80 may be pre-assembled to the stator terminals 82 when, for example, the electric motor 12 is housed in the electric motor case 16. Alternatively, the integrally connected washer 80 may be assembled to the stator terminals 82 using the service hole 46 after the electric motor 12 is housed in the electric motor case 16 and the PCU 14 is subsequently fixed to the electric motor case 16. By the use of the stator terminals 82 having the protrusions 84 and 86, it is possible to perform the fastening without temporarily fixing the fastening bolt 40 while preventing the bending of the stator terminals 82 by using the integrally connected washer 80.

It should be noted that, in the example shown in FIG. 8A, the protrusions 84 and 86 are provided on the side of the stator terminals 82. Instead of this kind of example, a protrusion having a similar function may be provided on the side of the PCU terminals 28 (including the protective member 34).

4. Fourth Embodiment

Next, an electric drive unit according to a fourth embodiment will be described with reference to FIGS. 9 to 11. The electric drive unit according to the present embodiment is different from the electric drive unit 10 according to the first embodiment described above in the shape of the stator terminals.

4-1. Terminal Structure

FIG. 9 is a view used to describe an additional issue when the PCU 14 is assembled to the electric motor case 16. FIG. 9 shows the stator terminal 26 according to the first embodiment for the purpose of describing the additional issue. When the PCU 14 is assembled to the electric motor case 16, the PCU terminal 28 approaches the fastening portion 26b as shown in FIG. 9 in order to overlap the fastening portion 28b of the PCU terminal 28 with the fastening portion 26b of the stator terminal 26. At this time, as shown in FIG. 9, the tip of the PCU terminal 28 may interfere with the fastening portion 26b. It should be noted that, in order to avoid this kind of interference, it is conceivable to secure a large gap (gap in the left-right direction in FIG. 9) between the fastening portion 26b and the fastening portion 28b. However, if this gap is increased, there is a concern that the stator terminal 26 may be bent at the time of fastening.

Figure 10:
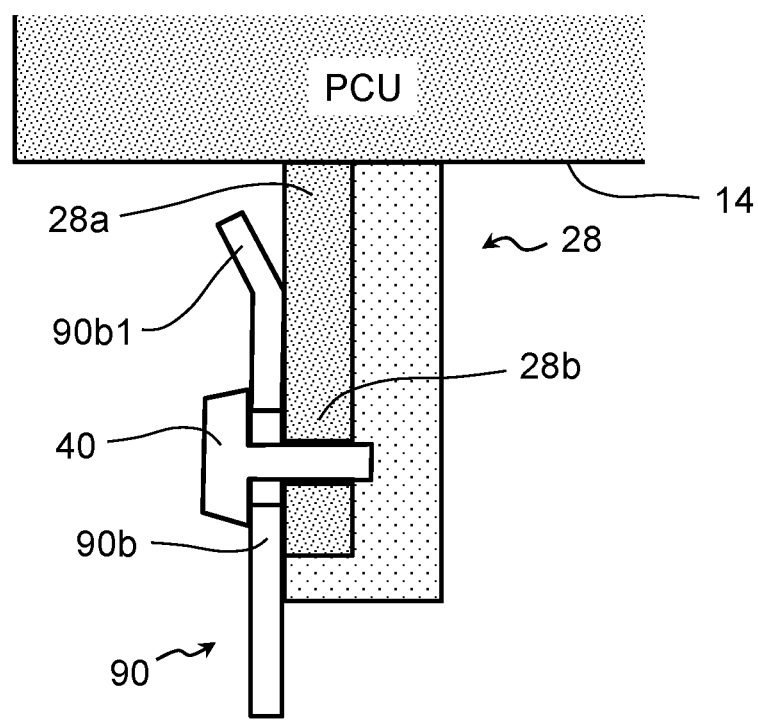
FIG. 10 is a diagram used to describe a configuration of stator terminals included in an electric drive unit according to a fourth embodiment of the present disclosure.

FIG. 10 is a diagram used to describe a configuration of stator terminals 90 included in the electric drive unit according to the fourth embodiment. In view of the additional issue described above, the stator terminals 90 of the electric drive unit according to the present embodiment are configured as follows.

That is, a fastening portion 90b of each of the stator terminals 90 has a tip portion 90b1 on the PCU 14 (see FIG. 1) side. FIG. 10 shows the fastening portion 90b of the stator terminal 90 which is fastened to the fastening portion 28b of the PCU terminal 28. The tip portion 90b1 is formed so as to be inclined such that the tip position of the tip portion 90b1 is separated from the fastening portion 28b in the fastening state shown in FIG. 10. It should be noted that this kind of inclined shape of the tip portion 90b1 may be provided on the stator terminals according to other embodiments such as the second embodiment.

4-2. Effect

Figure 11:
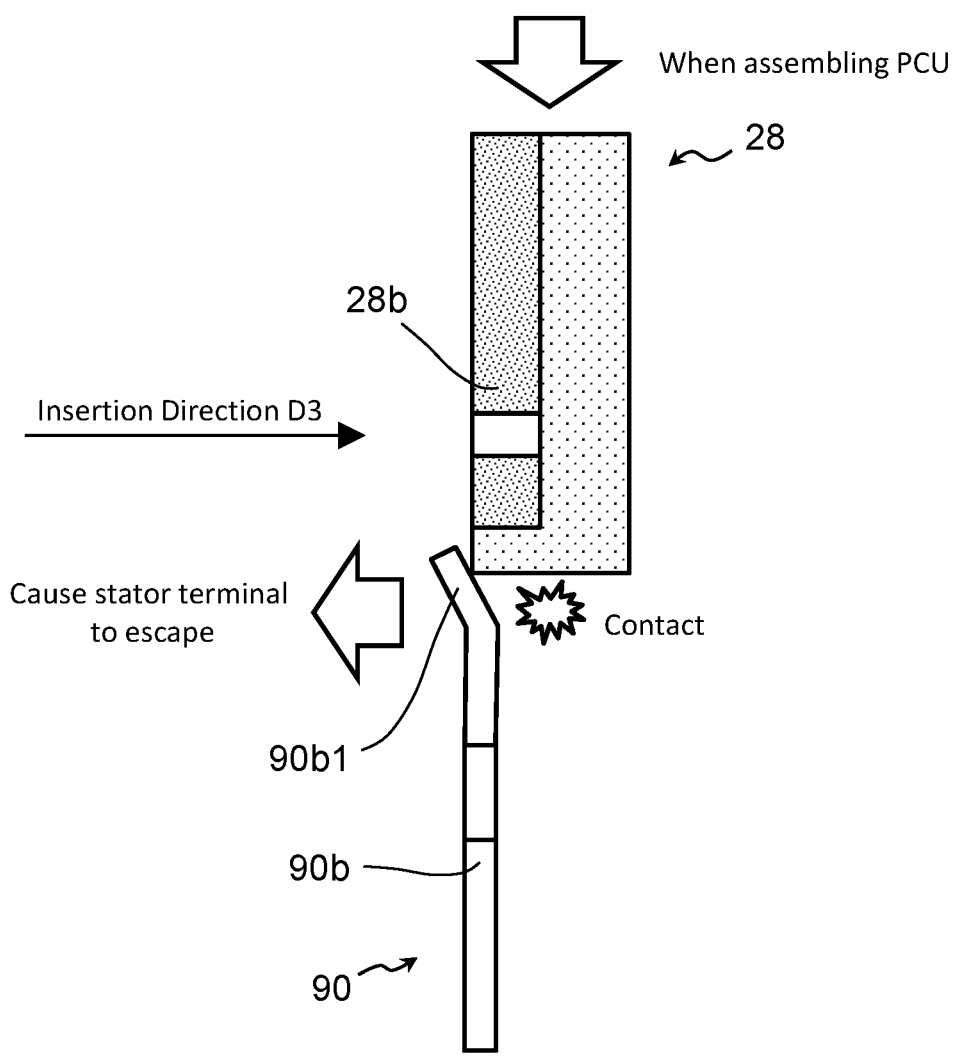
FIG. 11 is a diagram used to describe an effect of the fourth embodiment.

FIG. 11 is a diagram used to describe an effect of the fourth embodiment. According to the electric drive unit of the present embodiment, the stator terminal 90 is provided with the tip portion 90b1 on the PCU 14 side formed as described above, whereby the following effects can be obtained. That is, as shown in FIG. 11, even if the PCU terminal 28 comes into contact with the fastening portion 90b during assembly of the PCU 14, the stator terminal 90 can escape in a direction parallel to the insertion direction D3 (axial direction D1) of the fastening bolt 40 owing to the inclined shape of the tip portion 90b1. As a result, when the PCU 14 is assembled to the electric motor case 16, it is possible to reduce or prevent the occurrence of bending of the stator terminal 90 due to contact with the PCU terminal 28.

Instead of the three-phase AC motor described above, the present disclosure may be applied to a multi-phase AC motor having a plurality of first terminals through which a current of each phase of multi-phase alternating current other than three-phase alternating current flows.

The embodiments and modification examples described above may be combined in other ways than those explicitly described above as required and may be modified in various ways without departing from the scope of the present disclosure.

What is claimed is:

1. An electric drive unit, comprising:
   a multi-phase AC motor including a rotor, a stator, and a plurality of first terminals through which a current of each phase of multi-phase alternating current flows;
   a power converter including a plurality of second terminals associated with the plurality of first terminals; and
   an electric motor case that includes a wall portion formed to partition between the AC motor and the power converter, and is formed to house the AC motor, wherein
   the power converter is fixed to the electric motor case so as to partially overlap the AC motor in an axial direction of the rotor while interposing the wall portion between the power converter and the AC motor,
   each of the plurality of first terminals includes: a first extended portion extending from the stator along the axial direction; and a first fastening portion which is a tip of one of the plurality of first terminals,
   each of the plurality of second terminals includes: a second extended portion extending along an extending direction at a portion of the power converter that does not overlap the AC motor in the axial direction; and a second fastening portion which is a tip of one of the plurality of second terminals, the extending direction being a direction from the power converter toward an inside of the AC motor in a radial direction,
   the first fastening portion and the second fastening portion are fastened to each other via a fastener,
   the electric motor case includes: a communication hole formed in the wall portion to pass the plurality of second terminals; and a service hole formed in a portion located on an extension line of the fastener parallel to an insertion direction of the fastener with respect to the first and second fastening portions, the AC motor is a three-phase AC motor, the plurality of first terminals are three first terminals, the plurality of second terminals are three second terminals including three second extended portions and three second fastening portions, and the three second extended portions are formed to extend in the extending direction while being gathered so as to narrow a fastening point pitch of the three second fastening portions after being offset from each other in the insertion direction, and are formed such that fastening points of the three second fastening portions are offset from each other in the extending direction.

2. The electric drive unit according to claim 1, wherein the service hole is circular.

3. The electric drive unit according to claim 1, wherein the communication hole is circular.

4. The electric drive unit according to claim 1, wherein the first fastening portion and the second fastening portion are arranged side by side along the axial direction, and the service hole is formed on an end face of the electric motor case in the axial direction.

5. The electric drive unit according to claim 4, wherein in a view of the electric motor case from the axial direction, at least a part of the service hole overlaps the stator.

6. The electric drive unit according to claim 1, further comprising an integrally connected washer interposed between a plurality of first fastening portions and the fastener.

7. The electric drive unit according to claim 1, wherein the first fastening portion includes a tip portion located on a side of the power converter, and the tip portion is formed so as to be inclined such that a tip position of the tip portion is separated from the second fastening portion to which the first fastening portion is fastened.

* * * * *